Dec. 27, 1960 C. W. MEYERS 2,966,016
MATERIAL HANDLING APPARATUS
Filed Sept. 9, 1958 4 Sheets-Sheet 1

Cornelius W. Meyers
INVENTOR.

BY Ramsey and Kolisch
Attys.

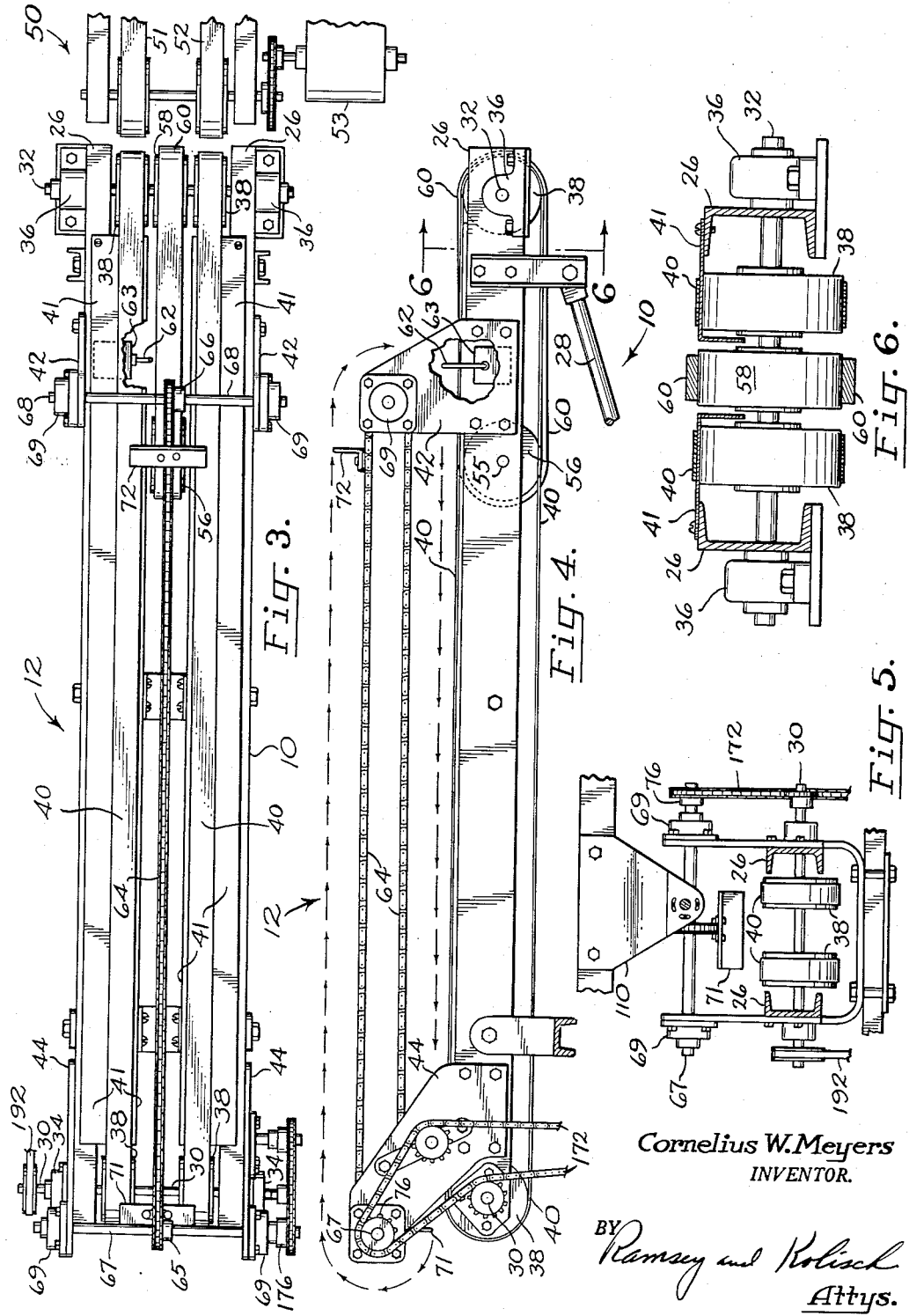

Cornelius W. Meyers
INVENTOR.

Dec. 27, 1960 C. W. MEYERS 2,966,016
MATERIAL HANDLING APPARATUS
Filed Sept. 9, 1958 4 Sheets-Sheet 4
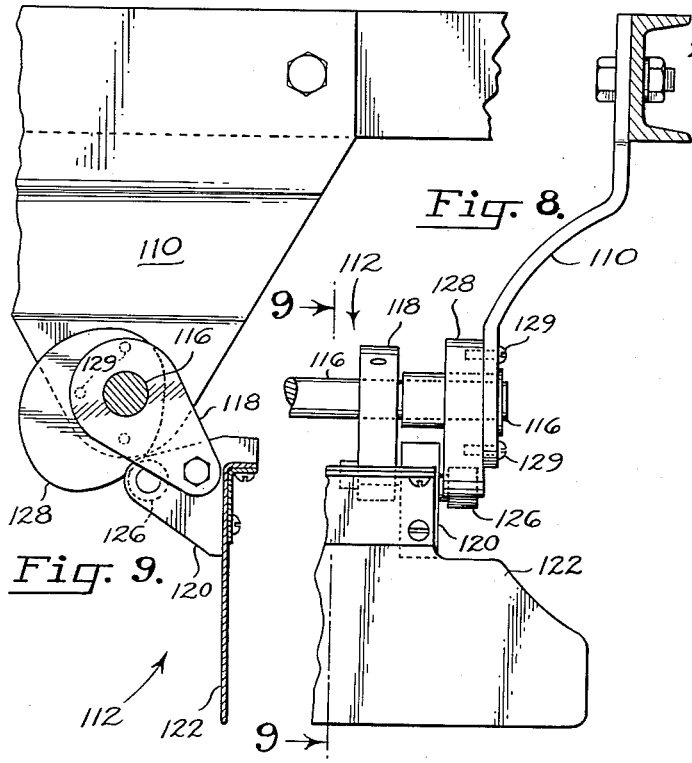
Fig. 8.
Fig. 9.
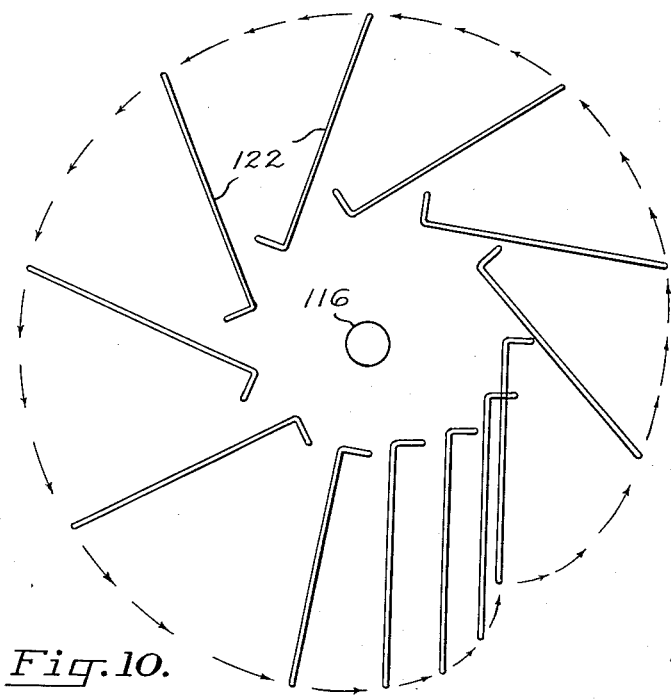
Fig. 10.
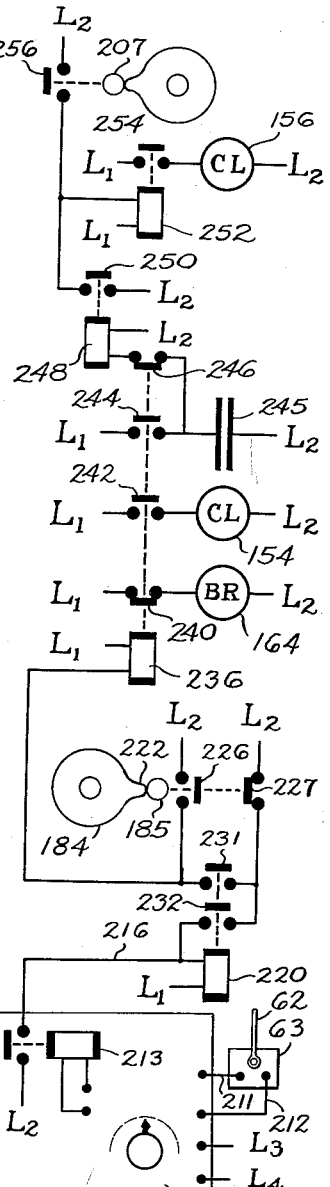
Fig. 11.
Cornelius W. Meyers
INVENTOR.
BY Ramsey and Kolisch
Attys.

United States Patent Office 2,966,016
Patented Dec. 27, 1960

2,966,016

MATERIAL HANDLING APPARATUS

Cornelius W. Meyers, 1316 SE. Umatilla St., Portland, Oreg.

Filed Sept. 9, 1958, Ser. No. 759,911

14 Claims. (Cl. 53—61)

This invention relates to a material handling apparatus, and more particularly to handling apparatus of a type such as may be used for loading plural packages in plural rows on a tray or similar support surface. The invention is characterized by a number of novel features relating to the construction of a collection station employed to receive packages prior to their loading on a tray, means for clearing the collection station of such packages and depositing them on a tray, means for packing successive rows of packages tightly together on a tray, and control mechanism for coordinating the operation of the various moving parts in the apparatus.

Generally, it is an object of this invention to provide for a processing line delivering a stream of packages, improved mechanism for assemblying the packages in plural rows on a tray or other loading surface, wherein the mechanism is fast and unfailing in operation, and functions consistently to pack the packages in tight rows on a loading surface, with each row containing a predetermined number of packages.

A related object of the invention is to provide for such handling apparatus a novel control mechanism which is readily adjusted to take care of changes in package or tray sizes, by appropriate selection of the number of packages to be contained in a row and/or the number of rows to be placed on a tray.

The material handling apparatus of this invention has particularly utility in connection with the frozen food industry. Frozen fruits, vegetables, and the like are commonly packaged in packages of rectangular outline having various outer dimensions. For instance, packages measuring 1⅜″ x 4″ x 5″, and packages measuring 1″ x 1¼ x 5″ are often used. These packages or containers are filled, and then are usually transported along an elongated conveyer to a loading station where they are loaded in plural rows on trays for freezing.

In operations of the type described, a number of problems exist, which have seriously limited the use of mechanical means for performing the tray loading function. For one thing, the food packages usually flow from the processing line of the tray loading station at a relatively fast rate, and difficulties have been encountered in selecting rapidly and accurately the appropriate number of packages to complete a row on a tray. Further, loading of a tray is difficult, since freezer trays for best results are designed snugly to carry the packages deposited thereon, and it is hard to produce a snug fit without damage to the packages. The freezer trays are snugly filled with packages, since such packing enables greater utilization of freezer space, and reduces air gaps between packages, which is desirable in reducing time spent in freezing.

More recently it has been the practice to construct freezer trays with rather extensive upturned support shoulders or rims around their peripheral edges, so that when plural trays are stacked one over another, these shoulders may also function as supports for trays stacked thereover. These shoulders or rims usually have a height equal substantially to the width of a package, and plural trays are stacked one over another with upper trays supported directly by lower trays. Tray rims of these proportions have added to the problem of packing a tray, since they prevent the sidewise shoving of the last row of packages directly into position on a tray.

In general terms, apparatus constructed according to this invention comprises a collection station which is adapted to be mounted at the outfeed end of the usual delivery conveyer transporting packages away from the food packing portion of a processing line. Associated with the collection station is a conveyor means for moving packages into the station. Packages are collected in the station until a predetermined number have entered the station, at which time a clearance mechanism moves the packages as a line of packages onto a tray. A packer vane then operates to skid the packages sidewise against a previously deposited line of packages, or if the tray is empty, toward a marginal rim of the tray. The apparatus includes tray conveyer mechanism for moving the tray in steps after each line of packages is moved onto the tray, thereby to ready the tray for the reception of a succeeding line of packages. The packer blade during tray loading acts as a guide and aligning means, and also as a separator means between package rows. This functions to prevent "hanging up" of the packages during tray loading.

A feature of the invention is the provision of a collection station wherein the packages are rapidly moved away from the delivery conveyer which supplies the packages, and then crowded together in an elongated row prior to their discharge on a tray. Crowding the packages assures that they are discharged as a line of packages containing a predetermined number of packages. Thus the collection station comprises a smooth surfaced conveyer belt means driven at a substantially faster speed than the delivery conveyer which is operable quickly to transport packages away from the delivery conveyer and to carry them up against a releasable holding means near the outfeed end of the station. On release of the holding means, the packages are free to move out of the collection station. Prior to this time, however, the smooth surfaced conveyer belt means slides under the packages already crowded against the holding means, while constantly urging the packages together under light pressure.

A counter mechanism is provided for counting packages as they enter the collection station. After reaching a predetermined count, the counter mechanism operates a control circuit to cause release of the holding means and movement of the clearance mechanism whereby packages are cleared from the collection station. It is important that the count of the counter mechanism be accurate, in order that the same number of packages consistently be collected to make up a row. Thus, it is an object of the invention to provide, with a collection station of the type described, a spreader mechanism at the infeed end of the collection station for spreading apart packages discharged from the delivery conveyer, to prepare the packages for actuating a counter mechanism. It is contemplated that the spreader mechanism may take the form of a belt surfaced with a high coefficient of friction material mounted adjacent the outfeed end of the delivery conveyer and at the infeed end of the collection station. This belt is driven at a speed equal approximately to the running speed of the smooth surfaced belt conveyer means, but at a substantially faster speed than the speed of the delivery conveyer. The belt operates to pick up packages discharged from the delivery conveyer and impart to these packages a velocity approximately equal to the velocity of the belt conveyer means of the collection station. The belt at the same time operates to spread apart the packages, enabling an accurate count thereof by the counter mechanism.

As mentioned hereinabove, a tray conveyor is provided to transport trays past the outfeed end of the collector station, and a packer blade or vane is included for skidding a line of packages transversely of the length of the package line against an adjacent row of packages already deposited and positioned on a tray. While the packer blade is effective in partially crowding adjacent rows of packages together, the blade is not used finally to pack adjacent rows together, as such use of the blade tends to cause damage to the packages. Neither is the blade used for final positioning of the last row of packages on a tray since the high shoulders or rims at the margins of a tray would incumber the blade if used for this purpose.

This invention contemplates, as a means for final crowding together of adjacent rows of packages and for final positioning of the last row of packages received by a tray, the provision of mechanism for jarring or joggling the tray in a direction normal to the rows of packages deposited on the tray. Further, the tray conveyer mechanism is constructed so as to stop movement of a tray supported thereon, at the time that the tray is waiting for the last row of packages to be deposited thereon from the collection station, when the tray is positioned with a side edge shoulder thereof located underneath the packages as they are moved from the collection station. Thus, after the packages are deposited on the tray, they come to rest on the tray with their bottom surfaces partially resting on the edge shoulder or rim, and partially resting on the floor of the tray. The packages at this time are not snugly fitted on the tray, but they readily fall in place after the tray is jarred, to assume a tightly compacted arrangement on the tray.

Another more specific object of the invention is to provide novel clearance means for the collection station, which functions to move a row of packages quickly from the station, without appreciable disarrangement of the row or damage to the packages.

A still further object of the invention is the provision of a novel packer blade construction for shifting a line of packages on a tray, wherein the packer blade positively and firmly moves a line or row of packages on a tray toward crowding relation with a preceding row, and then moves out of engagement with the line of packages without flipping or skewing of the packages thereby to cause disarrangement of the row.

These and other novel features and advantages are attained by the invention, which is described hereinbelow in conjunction with the accompanying drawings wherein:

Fig. 3 is a top view of a package collection station in the apparatus;

Fig. 4 is a side elevation of the package collection station shown in Fig. 3;

Figure 1:
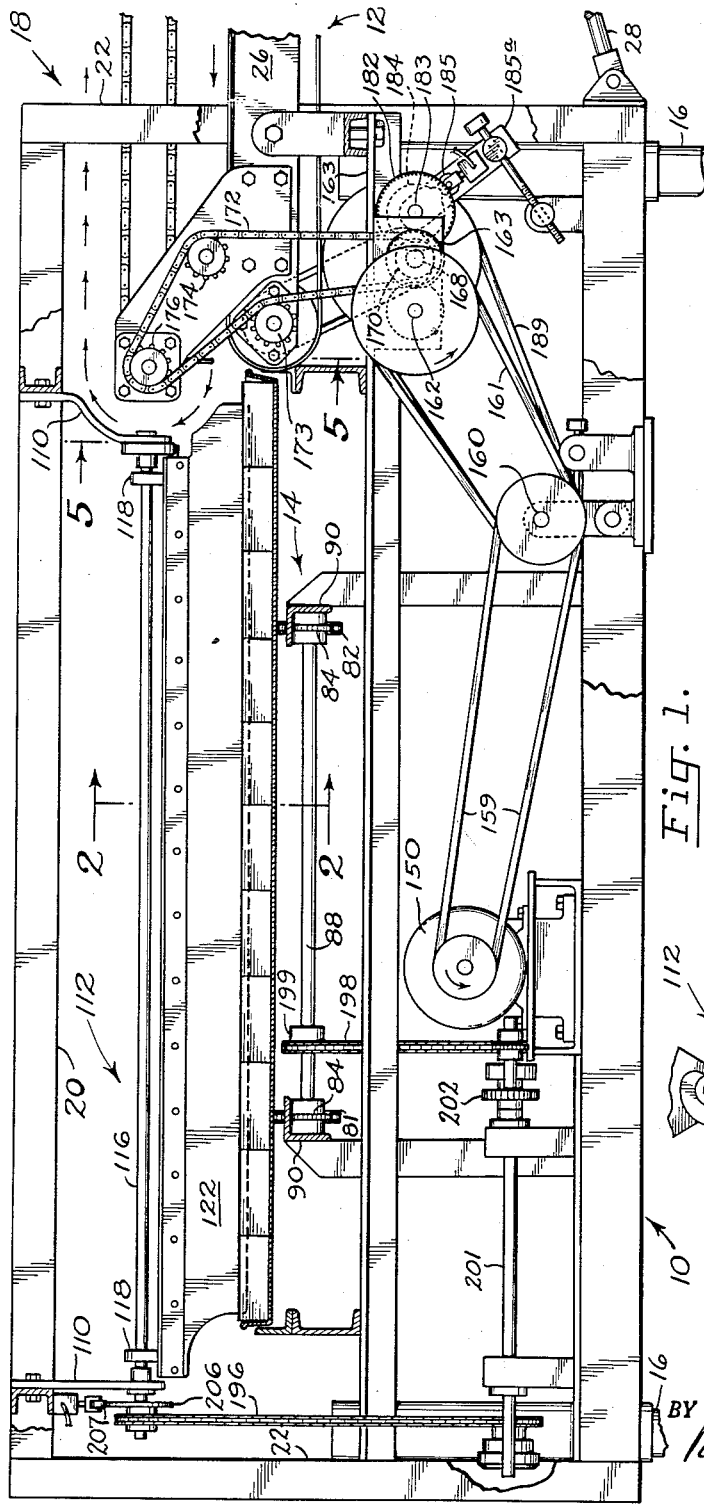
Fig. 1 is a side elevation of one end of apparatus constructed according to an embodiment of the invention, showing a tray conveyer mechanism and a packer means mounted above the tray conveyer mechanism.
Figure 7:
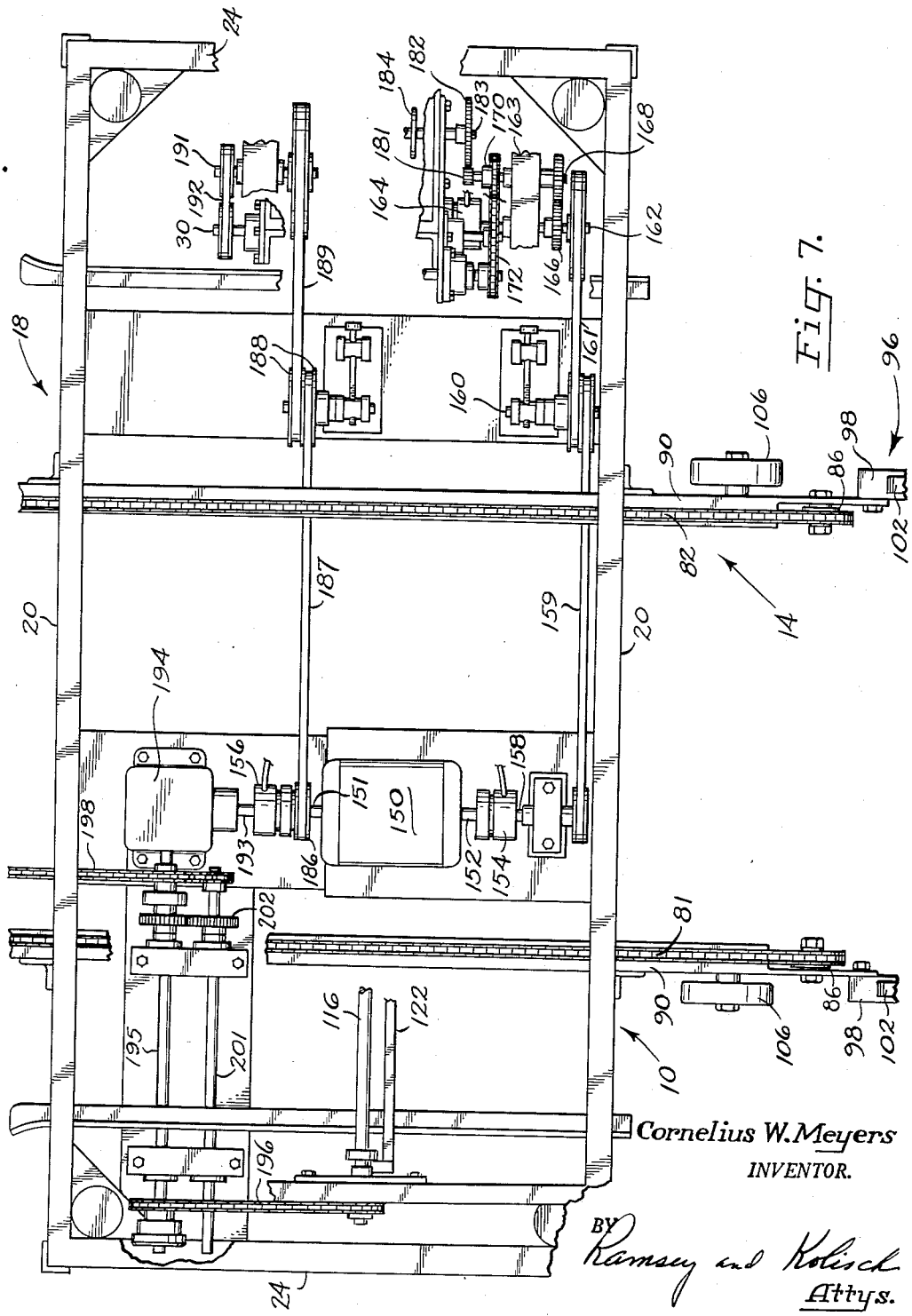

Fig. 5 in a section view along the line 5—5 in Fig. 1, slightly enlarged, illustrating details of the outfeed end of the collection station;

Fig. 6 is a section view along the line 6—6 in Fig. 4, slightly enlarged, showing the infeed end of the collection station and the package spreader and pickup belt;

Fig. 7 is a top view, with portions broken away, of the tray conveyer and associated mechanism illustrated in Fig. 1;

Fig. 8 is an enlarged view of the right hand end of the packer means illustrated in Fig. 1, illustrating details of the mounting for the packer mechanism;

Fig. 9 is a section view along the line 9—9 in Fig. 8;

Fig. 10 is a diagrammatic showing of the various positions occupied by the packer blade of the packer means upon rotation of the blade during a packing pass; and Fig. 11 is a schematic of a control circuit employed in the invention.

Referring now to the drawings for a description of a specific embodiment of the invention, and in particular to Figs. 1, 3, 4, and 7, the material loading apparatus illustrated comprises, in general, a frame structure 10 supporting at the right side of the apparatus, as viewed in Fig. 1, a package collection station indicated at 12. (The latter is shown only partially in Fig. 1 but completely in Figs. 3 and 4.) Frame 10 mounts at the outfeed end of the package collection station a tray conveyer mechanism indicated generally at 14. The tray conveyer mechanism transports trays one after another along a path located in front of the package collection station and extending transversely of the collection station.

Frame 10 comprises upright legs 16 supporting the opposite ends of a box-like, rectangular table structure 18, made up of longitudinal, vertical, and transverse members 20, 22, and 24, respectively. Suitably affixed to and extending outwardly to one side of the table structure are a pair of opposed, elongated beams 26, which have their outer, under sides braced to the main portion of the frame 10 by bars 28. Beams 26 provide the principal support for collection station 12.

Considering for the present collection station 12, and with particular reference now to Figs. 3, 4, 5, and 6, extending transversely between opposed beams 26, and mounted at opposite ends thereof, are a pair of pulley shafts 30, 32. These shafts have journal portions at their ends which are rotatably mounted on beams 26 as by bearings 34, 36. Pulley shafts 30, 32 are affixed to sets of pulleys or rolls 38, which have trained thereover a pair of smooth surfaced belts 40, which constitute smooth surfaced belt conveyer means in the apparatus. The pulleys mount the belts with the upper runs of the belts occupying a substantially horizontal plane. Rail members 41 support the upper belt runs between the outer reaches of the belts.

A pair of opposed mounting plates 42 at the infeed end of the station and a similar pair of mounting plates 44 at the outfeed end of the station are affixed to beams 26 and project upwardly therefrom. These are carried by the beams outwardly of the belts, and define the lateral limits of the collection station. Thus rail members 41, together with belts 40 and the mounting plates, define the collection station for the apparatus, with belts 40 providing a means for transporting packages into and through the station. The belts are rotated by means to be described, with the upper runs of the belts moving from right to left in Figs. 3 and 4, or toward the outfeed end of the station.

Packages are discharged at the infeed end of the collection station by the usual delivery conveyer, indicated generally in Fig. 3 at 50. The delivery conveyer, comprising belts 51, 52 appropriately trained over supporting pulleys and driven by motor 53, carries packages away from the food packing section of the processing line. These belts in the usual instance are almost fully loaded, and carry food packages closely spaced thereon. Thus the delivery conveyer discharges a rapid stream of packages to the infeed end of station 12.

For reasons hereinafter to be made apparent, belts 40 of the collection station are driven at a substantially faster rate than belts 51, 52. These belts 40, it will be remembered, are smooth surfaced belts with little tractive effect. Thus traction mechanism is provided at the infeed end of station 12 for imparting to packages delivered thereto a velocity approximating that of the velocity of smooth surfaced belts 40. The traction mechanism, by speeding up the movement of packages as they leave the delivery conveyer, also has the effect of spreading or spacing apart the packages.

Specifically, intermediate pulley shafts 30, 32 and extending transversely between beams 26 is a fixed shaft section 55. Shaft section 55 rotatably supports between its ends a pulley or roll 56. Pulley 56 cooperates with another pulley 58 secured to pulley shaft 32 in mounting a traction belt 60. This belt, unlike belts 40, is surfaced with rubberized fabric or other high coefficient of friction material. The belt is also somewhat thicker than belts 40. By reason of the surfacing of the belt and its thickness, the belt operates to grab a package deposited thereon while raising it slightly from the smooth surfaced belts. Belt 60, since it rotates with pulley 58 and shaft 32, also speeds up the package before dropping the package on belts 40. The belt in this way functions as a pickup means spreading apart packages at the infeed end of the station.

Mounted on one of the beams 26 intermediate the upper runs of belts 40 is a switch 63 having an upwardly projecting, pivotable switch finger 62. The switch finger projects upwardly into the path of packages spread apart by belt 60, and is actuated by such packages to cause closing of switch 63. The switch is part of the control means regulating the clearing of packages from station 12.

Referring now more specifically to Figs. 3, 4, and 5, overlying smooth surfaced belts 40 is a station clearance means or mechanism comprising a chain belt 64, which constitutes a clearing belt in the apparatus. Belt 64 is trained over sprockets 65, 66 secured to sprocket shafts 67, 68. Shafts 67, 68 are rotatably supported on sets of mounting plates 42, 44, as by bearings 69. Sprockets 65, 66 support chain belt 64 above belts 40 with the lower run of the chain belt spaced upwardly from but substantially parallel to belts 40.

Affixed to chain belt 64 and spaced at regular modules therealong, more specifically secured to opposite ends of the belt, are a pair of outwardly projecting separator lugs or fingers 71, 72. When these lugs are carried by movement of belt 64 so that they overlie the upper runs of belts 40, lower portions of the lugs are positioned to engage packages transported along belts 40. Lugs 71, 72 perform two functions. During loading of station 12 chain 64 is stationary, and the back side of a lug, i.e., the side of a lug facing the infeed end of station 12 when the lug is carried by a lower run of belt 64, comprises a releasable holding means for stopping forward progress of packages in the collection station until a predetermined number have been collected therein. The chain is driven to unload station 12, and during this time, the front side of a lug constitutes an abutment means for engaging a package to impart forward movement to a row of packages. Thus during the collection of a load of packages, belt 64 is positioned as shown in Figs. 3 and 4, with one of the lugs projecting downwardly at the outfeed end of the station and the other of the blades out of the way and carried by the upper run of the belt adjacent the infeed end of the station. When packages are to be ejected from station 12, chain 64 is moved (at a speed somewhat in excess of the speed of belts 40) until the two lugs change places with each other, and then stopped.

Packages ejected from the collection station are deposited on a freezer tray which is positioned in front of and below the outfeed end of the station on tray conveyer mechanism 14. Considering now the tray conveyer mechanism, and referring more particularly to Figs. 1 and 7, the conveyer mechanism comprises a pair of elongated chain belts 81, 82 mounted on frame 10 with opposite reaches of the belts trained over suitable sprockets 84, 86. In the embodiment shown, the belts are driven with the upper runs of the belts moving toward the viewer in Fig. 1, or downwardly of the page in Fig. 7. Sprockets 84 (see Fig. 1) supporting the infeed ends of belts 81, 82 are secured to a sprocket shaft 88 which is rotatably mounted on a pair of elongated beam members 90. Sprockets 86 are rotatably mounted directly to end portions of the beam members 90 as seen in Fig. 7.

Figure 2:
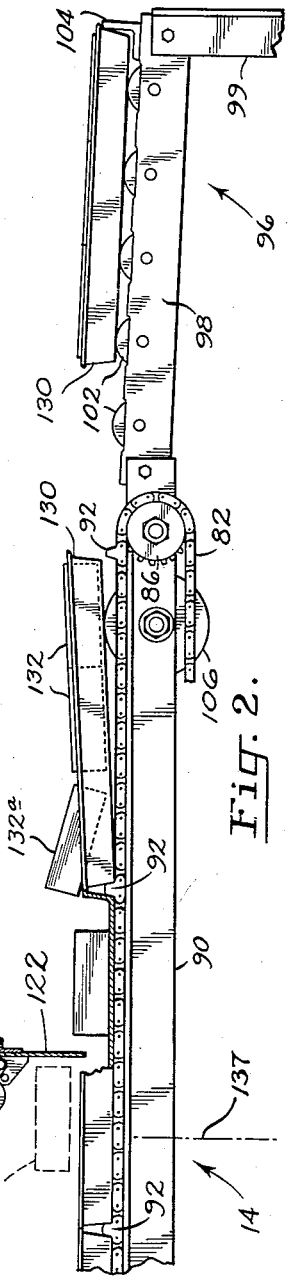
Fig. 2 is a section view along the line 2—2 in Fig. 1, illustrating further details of the packer means or mechanism and the jarring mechanism for finally positioning package rows on a tray.

Secured to chain belts 81, 82 and spaced at regular modules therealong are plural spacer lugs 92 (see Fig. 2). These are arranged on the two chain belts in cooperating pairs, with a spacer lug of one belt aligned in a direction extending normally of the chains with a spacer lug of the other belt. The spacer lugs operate positively to position a tray on the chain belts as these belts are driven to transport a tray in front of the package loader mechanism, comprising collection station 12 and the clearing chain 64. The upper runs of belts 81, 82 are supported in their movement by the upper surfaces of beams 90.

Referring now to Figs. 2 and 7, at the outfeed end of the tray conveyor mechanism is an inclined roll conveyor section, indicated generally at 96. This comprises a pair of oppositely disposed and inclined bar sections 98, which have their outer ends suitably supported above the ground as by uprights 99 and which have their inner ends secured to the outer ends of beams 90. Rotatably mounted at intervals along the bar sections are plural rollers 102. The rollers rotate freely in the bar sections, and when a tray is deposited on the roll conveyor section, gravity pulls the tray downwardly along the inclined section toward the lowermost end of the roll conveyor section.

At the end of the roll conveyor there is provided an elongated shoulder or abutment 104 which may take the form of an angle iron secured to bars 98. As a tray rolls down the roll conveyor section, it gathers speed, so that on hitting shoulder or abutment 104, the tray is jarred by a force acting on the tray in a direction extending normally to the side of the tray which strikes the abutment.

Rotatably mounted on outer ends of beam members 99 are a pair of enlarged rolls 106. As can best be seen in Fig. 2, the upper peripheries of these rolls are at a somewhat higher elevation than the elevation of the upper surfaces of the runs of chain belts 81, 82. When a tray moves onto rolls 106, it is lifted slightly, as shown in Fig. 2, prior to moving down conveyor section 96. The purpose of the construction is to speed up movement of a tray down section 96, as space considerations usually require that conveyer section 96 be relatively short. A tray, on traveling over rolls 106, tips downwardly onto conveyer section 96 after its center of gravity passes over the centers of rolls 106, and then moves fairly rapidly down the roll conveyor section.

Referring now to Figs. 1, 8, 9 and 10, mounted over the tray conveyer mechanism on depending support members 110 is an elongated packer mechanism, indicated generally at 112. The mechanism when at rest is arranged substantially parallel to collection station 12, and is in front of and to one side of the outfeed end of the station. The packer mechanism is provided for the purpose of clearing away packages from the area in front of the collection station, by skidding a row of packages transversely of its length toward a crowding position with a preceding row of packages deposited on a tray.

Packer mechanism 112 comprises a shaft 116 rotatably supported at its ends in members 110. Affixed to shaft 116 are a pair of arm portions 118, which rotate in unison with shaft 116. Rotatably mounted on the outer ends of arm portions 118 are a pair of packer blade mounts 120. Mounts 120 have attached thereto and support the ends of a vane or blade 122 of the packer mechanism.

During operation of the packer mechanism, shaft 116 is rotated to move vane 122 upwardly and forwardly from its lowermost position toward the outfeed end of the tray conveyer mechanism and conveyer section 96. The mounting for the packer blade includes cam and follower mechanism operable to shift the face of the blade as it moves through a work contacting arc, to maintain the face of the blade substantially in an upright position. This feature prevents the blade from catching onto the edge of a package and flipping the package during its compacting motion. The cam and follower mechanism and its operation is best illustrated in Figs. 8, 9, and 10.

Referring now to these figures, a blade mount 120 at one end of blade 122 rotatably supports a cam follower 126. Follower 126 rides over the offset surface of a cam 128. Cam 128 is secured as by screws 129 to one of the support members 110. When shaft 116 is rotated in a counterclockwise direction in Fig. 9, cam 128 pushes cam follower 126 outwardly from the axis of the shaft, during movement of the follower in a counterclockwise direction to the left and downwardly in Fig. 9. Continued movement of the follower results in the follower moving toward the axis of shaft 116, with the follower being urged into contact with the cam surface by the force of gravity acting on the blade 122. The cam and follower impart to blade 122 the various shifted positions shown in Fig. 10. It will be seen that the vane in moving upwardly from its lowered position is maintained substantially in an upright plane.

Before a new line of packages is deposited on a tray, the tray conveyer mechanism is stopped so that packages discharged thereon from station 12 are maintained in alignment. Blade 122 is stationary, and held in a vertical position toward the outfeed end of the conveyer mechanism from the discharge station. After a tray receives a new line of packages, the tray conveyer mechanism is started, simultaneously with actuation of blade 122. Blade 122 then sweeps from a lowered position up and around to its original position, moving at a somewhat faster rate than the tray conveyer, and the tray conveyer and blade are then stopped. This causes lateral shifting by the blade of any line of packages already on the tray, as well as lateral shifting of the newly added line of packages.

Referring now to Fig. 2, in the embodiment illustrated trays 130 are undergoing loading which have enlarged upstanding shoulders around their perimeters defining the tray boundaries. These rims have substantially the height of the width of a package, designated at 132. The rims are for supporting layers of trays when the trays are stacked.

According to this invention, during the loading of the last row of packages on a tray, the tray conveyer mechanism is stopped so as to hold a tray ready to receive the row of packages when the trailing shoulder or rim of the tray is located in the drop area for packages discharged from station 12. Thus when the row of packages are placed on the tray, the packages are partially supported by the rim and partially supported by the tray floor. They thus assume an inclined position, similar to the position shown for package 132a in Fig. 2. Subsequently, when the tray travels onto the tray conveyer section and is jarred, the last row of packages settles into place within the confines of the tray rims. In Fig. 2, the dotted outline 136 indicates the position of a package prior to discharge from station 12, and the dotted line 137 indicates the position of the trailing rim of a tray about to receive the last line of packages to be loaded thereon.

A single, constantly running motor is used in driving smooth surfaced belts 40, the clearing chain of the collection station, the tray conveyer mechanism, and the packer mechanism. Further, a control circuit is provided for operating the various intermittently actuated mechanisms in proper sequence. A counter mechanism in combination with a remote feeler system is employed for positioning the fingers of the clearing chain as this accommodates ready adjustment to take care of different package sizes, and further promotes accuracy and consistency in the number of packages collected in station 12 prior to discharge.

Referring to Figs. 1 and 7, 150 designates a normally continuously energized electric motor. The motor has projecting therefrom power output shaft-ends 151, 152. Shaft-end 152 is connectable with the clearing chain belt through an electric clutch 154. Similarly, shaft-end 151 is selectively connected to the packer mechanism and tray conveyer mechanism through an electric clutch 156.

Clutch 154, when engaged, connects for simultaneous rotation with shaft-end 152 a stub shaft 158. Stub shaft 158 is connected through pulleys and a belt 159 to an intermediate pulley shaft 160. The latter pulley shaft is connected by pulleys and a belt 161 to a power transfer shaft 162, which is rotatably mounted in a bracket portion 163 of the frame.

Power transfer shaft 162 has connected to its inner end an electric brake 164. Also attached to the power transfer shaft intermediate bracket 163 and belt 161 is one of a pair of reversing gears 166. The other of the pair of reversing gears which meshes with the first mentioned one of the pair is secured to a stub drive shaft 168. The latter shaft is rotatable in bracket portion 163, and has affixed thereto a sprocket 170 which has trained thereover a drive chain 172.

Drive chain 172 is trained over idler sprockets 173 and 174 and drive sprocket 176. This drive sprocket is affixed to sprocket shaft 67 carrying sprocket 65 (see Fig. 3) driving the clearing chain belt. From this description, it may be seen that when clutch 154 is engaged, drive is transmitted through the various belts, the reversing gears, and chain 172 to drive sprocket 176, so as to produce movement of the clearing chain.

Referring to Figs. 1 and 7, stub drive shaft 168 also has affixed to its inner end a gear 181 meshing with a gear 182 which is affixed to a cam shaft 183. A cam member 184 is secured to cam shaft 183 and rotates with the cam shaft and drive shaft 168. Held in position to engage the cam surface of cam 184 is a follower 185 mounted on a mounting 185a. The mounting accommodates adjustment of the position of follower 185 about the perimeter of cam 184. The cam and cam follower are part of a control means for the apparatus, to be described.

Smooth surfaced belts 40 are driven continuously by a pulley 186 affixed to shaft end 151, a belt 187, pulley pairs 188, and a belt 189. Belt 189 is trained over a pulley driving a drive shaft 191 which is connected to pulley shaft 30 by a belt 192.

Drive to the packer mechanism is through clutch 156, a gear box 194, shaft 195, and chain 196. Drive to the tray conveyer mechanism is through the same clutch shaft and gear box 194, a chain 198 and a sprocket 199. Sprocket 199 (see Fig. 1) is affixed to shaft 116. Chain 198 is driven by a sprocket on a reversing shaft 201, which is driven by shaft 195 through intermeshing gear pairs 202. The connections with the reversing shaft and shaft 198 may be interchanged when it is desired to drive the packer and tray conveyer mechanism in opposite directions.

A cam 206 (Fig. 1) is secured to shaft 116 for rotation therewith. Engaging the outer cam surface of cam 206 is a cam follower 207. The cam and cam follower perform functions similar to cam 184 and cam follower 185, and are part of the control means for the apparatus, to be described.

In operation, packages are collected in the collection station until a predetermined number of packages have passed by switch finger 62. When this number is reached, clutch 154 engages to cause movement of the clearing chain, with the rearmost of the lugs or fingers moving up to the position of that occupied formerly by the foremost lug or finger. The movement is rapid, so as to clear as quickly as possible the collection station. When this has occurred, the clearing chain is stopped, by disengaging clutch 154 and energizing brake 164, and the tray conveyer mechanism and packer mechanism is started by engaging clutch 156. Clutch 156 remains engaged until a tray is moved forwardly sufficiently to accommodate another line of packages and the packer mechanism has made one complete revolution. At this time clutch 156 is disengaged, and the entire operation is ready to repeat itself when a new line of packages is collected in station 12.

Fig. 11 illustrates a control circuit for the apparatus.

While some of the elements of the figure appear in the other figures, many of them have been eliminated from the other figures for reasons of clarity.

Referring to Fig. 11, switch finger 62 of switch 63, when turned or pivoted by the passage of a package thereover, completes a circuit between a pair of conductors 211, 212. These conductors are connected to an electronic counter 210 of conventional design, which is constructed to count up to a preset number of electric impulses delivered thereto and provide, after reaching said preset number, an electric output pulse by energizing a relay 213. Relay 213, when energized, completes a circuit between a D.C. line conductor L2 and a conductor 216. The electronic counter is powered by a pair of A.C. conductors L3, L4. Electronic counters are marketed by various manufacturers, such as Post Machinery Company of Beverly, Mass., Berkeley Scientific, a Division of Beckman Instruments, Inc. of Richmond, California, and Brush Electronics Co., an operating unit of Clevite Corporation, Cleveland, Ohio.

Conductor 216 is connected to one side of the solenoid of a relay 220. The other side of the solenoid of the relay is connected to another D.C. line conductor L1.

Cam member 184, previously described, has a lobe 222 which is operable to move follower 185 between a "rest" position (illustrated in Fig. 11) and a "running" position, wherein the follower under the urging of spring bias means (not shown) moves inwardly toward the rotation axis of cam 184.

Follower 185 is ganged to a pair of switches, a normally open switch 226, and a normally closed switch 227. Switch 226, when closed, connects conductor L2 with one of the switch contacts of a switch 231 of relay 220. Switch 227, when closed, connects conductor L2 with one of the switch contacts of a switch 232 of relay 220, and also connects conductor L2 with the other switch contact of switch 231.

When relay 213 of the counter is momentarily energized, current passes through the solenoid of relay 220, causing closing of switches 231, 232. Switch 227 functions to hold the solenoid of relay 220 energized upon deenergizing of the relay of the counter, until such time as lobe 222 moves out from under follower 185. Before movement of lobe 222 out from under follower 185, current flows from conductor L2 through switch 227 and switch 231 to the solenoid of a relay 236 (controlling electric brake 164 and clutch 154) and conductor L1. After lobe 222 moves out of engagement with follower 185, switch 227 opens and switch 226 closes, to effect energizing of the solenoid of relay 236 through switch 226. Thus the solenoid of relay 236 remains substantially constantly energized (except for a momentary and unnoticeable interruption when switches 226, 227 change positions) from the time the counter first sends out a pulse and relay 220 is first energized, until the time cam 184 completes one complete rotation. When this occurs, lobe 222 moves under follower 185, switch 226 opens, and the solenoid of relay 220 becomes deenergized, which also has the effect of deenergizing the solenoid of relay 236.

With the solenoid of relay 236 energized, a normally closed switch 240 of the relay opens to open up the circuit between conductors L1 and L2 for brake 164. A switch 242 of the relay closed to complete a connection between conductors L1 and L2 with electric clutch 154. A condenser charging switch 244 closes so as to produce charging of a condenser 245. Further, a switch 246 having one switch contact connected to one side of the solenoid of a starter relay 248 and its other switch contact connected to one of the charge surfaces of condenser 245 is opened. As a result, in this condition of the parts, clutch 154 is energized (producing movement of cam 184) brake 164 is deenergized, and condenser 245 is undergoing charging from conductors L1, L2.

As previously noted, when cam 184 completes one rotation the solenoid of relay 236 deenergizes. When this occurs, the switches of the relay return to the position illustrated in Fig. 11, with the result that current is discharged from condenser 245 through now closed switch 246 to the solenoid of relay 248 and conductor L2. This causes temporary energizing of the solenoid of relay 248, and closing of switch 250 of the relay. This closes a circuit for the solenoid of a power relay 252. Energizing of the solenoid of this relay closes a switch 254 of the relay. Upon closing of switch 254, a circuit is completed between conductors L1, clutch 156, and L2, the clutch becomes energized, and drive is transmitted to the packer mechanism and cam 206. Upon energizing of clutch 156 and rotation of cam 206, the lobe of the cam (which operates similarly to lobe 222 of cam 184) moves out from under cam follower 207, and a switch 256 ganged to the follower closes. This completes another circuit for energizing the solenoid of relay 252. Thus relay 252 remains energized after discharging of condenser 245 until such time as cam 206 completes one revolution. When this occurs, switch 256 opens and the solenoid of relay 252 is deenergized.

The control circuit operates as follows: Packages flow into the collection station until a predetermined number are collected. A count of the packages is kept by counter 210 in response to actuation by periodic closing of switch 63. Upon reaching a predetermined count, the solenoid of relay 220 is momentarily energized by an output pulse of the counter, which causes energizing of power relay 236, energizing of clutch 154 and deenergizing of brake 164. As a result, drive is transmitted to shafts 30 and 183 to cause rotation of the clearing chain and also rotation of cam 184. Movement of the chain and cam continues until the cam completes one revolution, so as to open switch 226 and close switch 227. This deenergizes the solenoid of relay 236, causing brake 164 to be energized and clutch 154 to be deenergized. It further produces energizing of a starter relay 248, which in turn produces energizing of power relay 252. This results in clutch 156 becoming energized and movement of the packer mechanism and tray conveyer mechanism, which continues until cam 206 completes one revolution, at which time the solenoid of relay 252 is deenergized and the operating cycle is complete.

It will be noted that a brake is employed for braking the clearing chain when stopping the chain, but none is employed for the tray conveyer and packer mechanism. The brake is provided for the clearing chain since this chain moves at a quite rapid speed, and thus has considerable inertia. The brake prevents overtravel of the clearing chain.

It is claimed and desired to secure by Letters Patent:

1. In combination with a delivery conveyer delivering a stream of packages, material handling apparatus for receiving and arranging such a stream of packages comprising an elongated package collection station for collecting a row of abutting packages and having conveyer means for transporting packages into said collection station from said delivery conveyer, releasable holding means at the outfeed end of said collection station operable in a hold position to limit forward movement of such a row of packages beyond said outfeed end and releasable from said hold position to accommodate forward movement of such a row of packages beyond said outfeed end of said station, means at the infeed end of said collection station for spreading in spaced-apart relation packages transported thereto by said delivery conveyer, a counter mechanism and actuating means at the infeed end of said station for operating the counter mechanism, said actuating means being actuated by packages when such packages are in spaced-apart relation, power-operated station clearance means movable longitudinally of said collection station for clearing packages therefrom as an elongated row of abutting packages lengthwise from the outfeed end of the collection station, and means controlled by said counter mechanism for actuating said station clearance means and releasing said releasable holding means upon said counter mechanism reaching a predetermined count.

2. In combination with a delivery conveyer delivering a stream of packages, material handling apparatus for receiving and arranging such packages comprising a frame, an endless, smooth surfaced belt conveyer means for transporting packages discharged from said delivery conveyer mounted on said frame with one of the reaches thereof adjacent the outfeed end of said delivery conveyer and having an upper run occupying a substantially horizontal plane, the upper run of said belt conveyer means defining a package collection station, a first drive means for driving said belt conveyer means at a faster speed than the speed of said delivery conveyer, rotatable pickup means surfaced with a high coefficient of friction material mounted at the outfeed end of said delivery conveyer and means for driving the pickup means at substantially the speed of said belt conveyer means, said pickup means being positioned and arranged to pick up packages discharged from said delivery conveyer and impart to such packages a velocity approximately equal to the velocity of said smooth surfaced belt conveyer means, station clearance means comprising an endless clearing belt mounted on said frame with one run thereof supported next to and substantially parallel to said upper run of said belt conveyer means, said clearing belt having finger means projecting therefrom spaced at regular modulus therealong, the modular spacing between successive finger means being equal approximately to the length of the upper run of said belt conveyer means, and a second drive means for driving said clearing belt at a speed substantially faster than the speed of said belt conveyer means.

3. The material handling apparatus of claim 2 which further comprises control means for said second drive means, said control means comprising a counter mechanism and actuating means mounted adjacent said pickup means for operating the counter mechanism, means controlled by said counter mechanism for actuating said second drive means to start movement of said clearing belt when said counter mechanism reaches a predetermined count, and means controlled by the movement of said clearing belt for actuating said second drive means to stop movement of said clearing belt upon movement of one of said finger means to a position spaced next to the other of the reaches of said belt conveyer means.

4. The apparatus of claim 2 wherein said second drive means comprises a normally constantly energized motor, and clutch means interposed between said motor and said clearing belt selectively for effecting a drive connection between the two, and which further comprises control means for said second drive means, said control means comprising a counter mechanism and actuating means mounted adjacent said pickup means for operating the counter mechanism, circuit means interconnecting said counter mechanism and said clutch means for actuating said clutch means to produce a drive connection when said counter mechanism reaches a predetermined count, and a timing member driven by said motor for actuating said clutch means to discontinue the drive connection after a predetermined time interval.

5. Material handling apparatus for arranging plural packages comprising an elongated package collection station for collecting a row of abutting packages and conveyer means for transporting packages into said collection station, releasable holding means at the outfeed end of said collection station operable in a hold position to limit forward movement of packages beyond said outfeed end and releasable from said hold position to accommodate forward movement of packages beyond said outfeed end, power-operated station clearance means movable along the length of said collection station toward the outfeed end thereof for clearing packages therefrom, means simultaneously for actuating said station clearance means and for releasing said releasable holding means to cause removal of packages from said collection station after a predetermined number of packages have been collected in said collection station, tray conveyer means mounted on said frame forwardly of and below said outfeed end of said station for transporting trays one after another in a path located in front of said collection station and extending transversely of said collection station, elongated packer means carried by said frame above said tray conveyer means occupying when at rest a position substantially parallel to but in front of and offset to one side of said collection station, means mounting said packer means accommodating transverse movement of the same across the outfeed end of said collection station, and motor means connected to said packer means for moving said packer means.

6. The apparatus of claim 5 wherein the means for actuating said station clearance means and for releasing said releasing holding means comprising a counter mechanism, and an actuating member for said counter mechanism positioned at the infeed end of said collection station for actuation by package moving thereby along said station, said counter mechanism producing actuation of said station clearance means and releasing said holding means on reaching a predetermined count.

7. In combination with a delivery conveyer delivering a stream of packages, material handling apparatus for receiving and arranging said packages on trays, said apparatus comprising a frame, an endless, smooth surfaced belt conveyer means for transporting packages discharged from said delivery conveyer mounted on said frame with one of the reaches thereof adjacent the outfeed end of said delivery conveyer and having an upper run occupying a substantially horizontal plane, the upper run of said belt conveyor means defining a package collection station, a first drive means for driving said belt conveyer means at a faster speed than the speed of said delivery conveyer, rotatable pickup means surfaced with a high coefficient of friction material mounted at the outfeed end of said delivery conveyer and means for driving the pickup means at substantially the speed of said belt conveyer means, said pickup means being positioned and arranged to pick up packages discharged from said delivery conveyer and impart to such packages a velocity approximately equal to the velocity of said smooth surfaced belt conveyer means, stationed clearance means comprising an endless clearing belt mounted on said frame with one run thereof supported next to and substantially parallel to said upper run of said belt conveyer means, said clearing belt having finger means spaced at regular modular intervals therealong projecting outwardly therefrom and positioned and arranged to contact packages carried in said collection station, tray conveyer means mounted on said frame forwardly and below the other of the reaches of said belt conveyer means for transporting trays one after another in a path located in front of and extending transversely of the other of the reaches of said belt conveyer means, elongated packer means carried by said frame above said tray conveyer means and occupying when at rest a position substantially parallel to said conveyer belt means but offset to one side thereof and means mounting said packer means accommodating movement of the same transversely of said conveyer belt means, a second drive means for driving said clearing belt with said one run of the belt moving toward said tray conveyer means, a third drive means for moving said packer means, and control means for actuating in sequence first said second drive means and then said third drive means.

8. The material handling apparatus of claim 7 wherein said control means comprises a counter mechanism and actuating means adjacent said pickup means for operating the counter mechanism, means controlled by said counter mechanism for actuating said second drive means to start movement of said clearing belt when said counter mechanism reaches a predetermined count, and means responsive to movement in the clearing belt for actuating said second drive means to cause stopping of said clearing belt and for actuating said third drive means to cause movement of said packer means after a predetermined amount of movement of said clearing belt.

9. Apparatus for arranging plural packages on a tray, said tray having opposed, raised shoulders along opposite side edges thereof, said apparatus comprising a frame, tray conveyer means mounted on said frame for moving such a tray in a path therethrough, means for stopping such a tray transported by said tray conveyer means at a predetermined position, package loader mechanism mounted on said frame to one side of said tray conveyer means for discharging a line of packages on such tray, said package loader mechanism being positioned and arranged on said frame relative to said tray conveyer means to discharge a line of packages on such a tray with the packages partially resting on one of the raised shoulders of such a tray when said tray is stopped at said predetermined position, and mechanism for jarring such a tray in a direction normal to the raised shoulders of the tray after a line of packages has been deposited on the tray.

10. The apparatus of claim 9 wherein the mechanism for jarring such a tray comprises a conveyor section mounted on said frame in front of the outfeed end of said tray conveyor means and sloping downwardly and outwardly from said tray conveyor means, and stop means mounted above said conveyor section positioned and arranged in the path of a tray transported downwardly on said conveyor section.

11. Apparatus for arranging plural packages on a tray, said tray having opposed raised shoulders along opposite side edges thereof, said apparatus comprising a frame, tray conveyor means mounted on said frame for moving such a tray along a path through the apparatus, means for stopping such a tray transported by said tray conveyor means at a predetermined position, package loader mechanism mounted on said frame to one side of said tray conveyor means for discharging a line of packages on such a tray, said package loader mechanism being positioned and arranged on said frame relative to said conveyor means to discharge a line of packages on such a tray with the packages partially resting on one of the raised shoulders of such a tray when said tray is stopped at said predetermined position, a free-running roll conveyor section mounted on said frame at the outfeed end of said tray conveyor, said roll conveyor section sloping downwardly and outwardly from the outfeed end of said tray conveyor, and stop means mounted above said roll conveyor section positioned and arranged in the path of a tray transported downwardly on the conveyor section.

12. Apparatus for arranging plural packages on a tray, said apparatus comprising a frame, tray conveyor means mounted on said frame for moving a tray along a path through the apparatus, package loader mechanism mounted on said frame to one side of said tray conveyor means for discharging a line of packages on a tray transported by said tray conveyor means, and packer means mounted above said tray conveyor means for shifting a line of packages deposited on tray by said loader mechanism in a direction extending transversely of the length of the line of packages, said packer means comprising an elongated packer blade arranged above but substantially parallel to a line of packages deposited on a tray by said package loader mechanism, and means mounting said packer blade accommodating movement of the blade about a rotation axis substantially parallel to the length of the blade, said blade moving during a portion of the rotation thereof through a work contacting arc wherein a line of packages are engaged and shifted in a transverse direction relative to the length of the line of packages, said mounting means having cam actuated means for shifting the plane of the face of the blade so as to maintain the face in a substantially upright position as the blade moves through the work contacting arc therefor.

13. In material handling apparatus for arranging plural packages on a tray, said apparatus having a tray conveyor for moving trays through the apparatus, a collection station for collecting plural packages and means for transporting packages into said collection station, and station clearance mechanism operable when actuated to move packages from said collection station onto a tray transported by said tray conveyor, means periodically for actuating said station clearance mechanism comprising a normally constantly energized motor having a power output shaft, power transmitting means between said output shaft and said clearance mechanism for transmitting drive from the former to the latter, said power transmitting means including selectively engageable clutch means for effecting a drive connection between said motor and clearance mechanism, a counter mechanism and actuating means for the counter mechanism positioned in the path of packages traveling into said collection station thereby to be actuated by such packages, circuit means interconnecting said counter mechanism and clutch means operable to actuate said clutch means to produce a drive connection between said motor and clearance mechanism upon said counter mechanism reaching a predetermined count, a cam member connected to said motor to be rotated by said motor when said clutch means is actuated to produce such drive connection, a cam follower positioned and arranged to engage said cam member, switch means connected to said cam follower for actuation thereby after a predetermined rotation of said cam member, and circuit means interconnecting said switch means and clutch means whereby said clutch means is actuated to discontinue a drive connection between said motor and clearance mechanism upon actuation of said switch means.

14. Apparatus for arranging plural packages on a tray, said tray having opposed raised shoulders along opposite side edges thereof, said apparatus comprising a frame, package loader mechanism mounted on said frame actuatable to discharge plural packages as a substantially horizontally extending line of packages, tray conveyor means mounted on said frame extending transversely of a line of packages discharged by the loader mechanism and constructed to transport a tray into receiving relationship beneath and with the raised shoulders of the tray parallel to such a line of packages, means for stopping a tray transported by the tray conveyor means at a position where one of its raised shoulders is in vertical alignment with and beneath a line of packages discharged by said loader mechanism, and means then for actuating said loader mechanism whereby a line of packages discharged by the loader mechanism moves onto the tray with the packages partially resting on the said one raised shoulder of the tray.

References Cited in the file of this patent

UNITED STATES PATENTS

| | | |
|---|---|---|
| 1,568,082 | Mitton | Jan. 5, 1926 |
| 2,552,620 | Christian | May 5, 1951 |
| 2,834,165 | Bonebrake | May 13, 1958 |
| 2,835,087 | Engelson et al. | May 20, 1958 |